(12) United States Patent
Viaene

(10) Patent No.: US 11,252,936 B1
(45) Date of Patent: Feb. 22, 2022

(54) ANIMAL FEEDING RESERVOIR AND DISPENSER

(71) Applicant: David Viaene, Hortonville, WI (US)

(72) Inventor: David Viaene, Hortonville, WI (US)

( * ) Notice: Subject to any disclaimer, the term of this patent is extended or adjusted under 35 U.S.C. 154(b) by 0 days.

(21) Appl. No.: 17/333,933

(22) Filed: May 28, 2021

Related U.S. Application Data

(60) Provisional application No. 63/182,509, filed on Apr. 30, 2021.

(51) Int. Cl.
    *A01K 5/02* (2006.01)
(52) U.S. Cl.
    CPC .................................. *A01K 5/0225* (2013.01)
(58) Field of Classification Search
    CPC .. A01K 5/0225; A01K 5/0233; A01K 5/0241; A01K 39/012; A01K 1/10; A01K 5/01; A01K 5/0107
    USPC .......................................................... 119/52.4
    See application file for complete search history.

(56) References Cited

U.S. PATENT DOCUMENTS

| | | | | |
|---|---|---|---|---|
| 5,092,273 A | * | 3/1992 | Meyer | A01K 5/0107 119/52.4 |
| 5,947,055 A | | 9/1999 | Cross | |
| D423,735 S | * | 4/2000 | Lile | D30/131 |
| D451,649 S | * | 12/2001 | Lovell | A01K 5/01 D30/131 |
| 8,763,555 B2 | | 7/2014 | Kurtz | |
| 9,567,169 B2 | * | 2/2017 | Camilletti | A01K 1/10 |
| 2002/0195060 A1 | * | 12/2002 | Dollahan | A01K 5/01 119/58 |
| 2010/0212597 A1 | * | 8/2010 | Wolfe | A01K 5/0107 119/58 |
| 2010/0263597 A1 | * | 10/2010 | Kerns | A01K 1/10 119/60 |

(Continued)

FOREIGN PATENT DOCUMENTS

| | | | |
|---|---|---|---|
| GB | 2570894 A | * 8/2019 | ............... A01K 1/10 |

OTHER PUBLICATIONS

Cantell Club Lambs, "Equipment: Lambing Jugs and Sheep/Goat Feeders", published on or before Feb. 4, 2021 at http://www.cantrellclublambs.com/equipment.html, retrieved from the internet on Feb. 4, 2021, 2 pages filed herewith.

(Continued)

*Primary Examiner* — Ebony E Evans
(74) *Attorney, Agent, or Firm* — Epiphany Law, LLC

(57) ABSTRACT

A gravity operated animal feeder, including, a reservoir area defined by at least two vertically sloped upper sides projecting upward and away from each other at distal ends. And, a dispensing area located under and: (i) in feeding communication with the reservoir area, and (ii) including at least two vertically sloped lower sides projecting downward and toward each other at proximal ends. And also, a vertical frame spaced from at least one of the at least two vertically sloped lower sides and defining an animal feeding region located adjacent to the dispensing area between the vertical frame and the vertically sloped lower sides. The feeder further includes a feeding trough area located under and: (i) in feeding communication with the dispensing area, and (ii) including a bottom located directly under and spaced from the proximal ends of the vertically sloped lower sides.

24 Claims, 8 Drawing Sheets

(56) References Cited

U.S. PATENT DOCUMENTS

2011/0253053 A1* 10/2011 Kurtz ...................... A01K 5/01
119/60

OTHER PUBLICATIONS

Klene Pipe Structures, "Assembly instructions for BK-6 Big Bale Cattle Feeder", published on or before Feb. 4, 2021 at http://www.klenepipe.com/wp-content/uploads/2014/07/BK-62Assembly.pdf, retrieved from the internet on Feb. 4, 2021, 4 pages filed herewith.
Klene Pipe Structures, "BK-6 Fence Line Hay Feeder for Cattle", published on or before Feb. 4, 2021 at http://www.klenepipe.com/bk-6-fence-line-cattle-hay-feeder/, retrieved from the internet on Feb. 4, 2021, 1 page filed herewith.
Premier 1 Supplies, "Build Your Own Feeders: Double Sided or Single-Sided Using Premier's Panels", published on or before Feb. 4, 2021 at https://www.premier1supplies.com/sheep-guide/wp-content/uploads/2012/10/BYO-Feeders-2012.pdf, retrieved from the internet on Feb. 4, 2021, 12 pages filed herewith.

* cited by examiner

ANIMAL FEEDING RESERVOIR AND DISPENSER

CROSS-REFERENCE TO RELATED APPLICATION

This application claims the benefit of U.S. Provisional Application No. 63/182,509, filed Apr. 30, 2021, and titled: ANIMAL FEEDING RESERVOIR AND DISPENSER.

TECHNICAL FIELD

This invention generally relates to devices for feeding animals, and more particularly to movable livestock feeders for use in storing and dispensing feed, namely, bales of hay, to a group of animals, particularly cattle.

BACKGROUND

The feeding of animals, and in particular livestock like cattle, presents several challenges to the farmer or rancher undertaking the task. Feeding is a costly and time-consuming operation. The economics of, for example, the beef cattle or dairy industry could be greatly improved if the manpower required in performing the feeding task and/or the amount of waste normally associated with feeding could be minimized.

One of the main reasons for the necessity of feeding pre-cut dried fodder or hay to livestock relates to climactic conditions. While the requirements for feeding pre-cut feed are dependent upon climate, almost all locations in the U.S. require that cattle and other livestock be fed at least part of the year. In northern states, such as Wisconsin and Minnesota, as well as other planes states, feeding may be required as much as nine months of the year.

One of the simplest feeding methods illustrates some of the inherent difficulties of any livestock feeding process. For example, in the feeding of cattle, merely placing a large hay bale in a pen containing a group of cattle leads to significant amounts of waste which can be as much as one-half of the bale or more. This is because the animals tend to break up the bale in order to pick the best parts from the bale. In so doing the other parts of the bale become trampled into the ground and soiled and are not eaten by the cattle.

Attempts to minimize the manpower required and reduce waste and feed losses in performing the feeding task have employed large, stationary feeding "pavilions". Many such devices have been introduced, such as large feeding troughs, conveyor devices, and the like. However, in general, these devices have had inherent drawbacks. First, many are mechanically complicated, making the use of such devices for the small rancher almost prohibitive in terms of initial purchase as well as maintenance and upkeep. Second, they require that a large number of cattle be fed in a very confined area which leads to sanitary and disease problems. Third, huge quantities of feed are placed in these devices where the cattle, even when restrained by stanchions, have almost unrestrained access to the loose fodder. Thus, just as when a large bale of hay is placed in a pen area, the feeding cattle broadcast or spill or otherwise dump a large fraction of the feed on the ground where it is trampled and soiled. The trampled and soiled feed cannot be eaten and is therefore wasted.

Smaller cattle feeders are available and consist generally of a head-level rack for storing hay, either loose or baled, and a trough in the area below the rack. The purpose of the trough is to catch any hay that falls from the rack. The cattle eat both from the rack and from the trough. These conventional cattle feeders also have rather high rates of hay waste, sometimes as much as 30% or more, through scattering of the hay and the hay being blown away or trampled.

Not only do cattle pick through the hay bale as discussed above, they do not eat neatly, which further contributes to the generation of waste during the feeding process. The main manner in which the waste occurs begins with the cow tearing a tuft of hay out of the bale. The cow then draws the tuft of hay out of the bale, and aside, before starting to eat the mouthful of hay. Inevitably, a proportion of hay falls from the cow's mouth or from the bale of hay during the tearing, drawing out and subsequent eating of the hay by the animal.

Another disadvantage of portable feeders is that livestock, especially large livestock such as cattle, bump and push against the portable feeders during feeding. After a period of time, the portable feeders become bent or deformed due to the contact with the livestock and must be repaired or discarded. This represents a substantial cost and inconvenience. The livestock often must be fed manually in the interim when the feeder is being repaired or replaced, which results in greater feed waste and increased labor costs.

Also, when portable or movable feeders are located in the pasture, the feeder must be easily accessible by vehicles used for loading the feeder with hay bales or transporting the feeder. This vehicle access may be hampered by feeders that are accessible from all sides because the livestock trample the ground around the entire feeder, often making the ground around the feeder unstable due to the formation of mud and loose soil. The unstable ground may not only prevent the feeder from being loaded or moved, it may also present a safety hazard to the operator of a loading vehicle such as fork lift, especially a fully loaded fork lift carrying a hay bale weighing on the order of 500 pounds to 2000 pounds. It is generally undesirable to operate on or have a fork lift travel over unstable ground, especially a loaded fork lift. The fork lift may become stuck, may slide or skid, and also may, under certain circumstances, tip over. Injury to the operator and/or livestock, equipment damage, hay waste, lost time and manpower are all possible consequences of attempting to load a feeder having unstable ground surrounding it. Often the feeder may not be used unless it is loaded by hand in the pasture. This is often the case until the ground stabilizes and the feeder can be approached with a vehicle to load or move it.

Thus, there is a need to address one or more of the deficiencies in the art to better aid in achieving more desirable requirements and avoiding negative ones, for livestock feeders, and preferably in a way that is more consistent and reliable for such devices. For example, it would be desirable to have a livestock feeder design which may be used either for a permanent installation or a movable livestock feeder. Advantageously, such a feeder would have a high feeding efficiency, by preventing the cattle from easily removing feed to a location outside of the trough and also by having a feeder design which results in essentially complete consumption of the feed contained in it.

SUMMARY

To address one or more deficiencies in the art and/or better achieve the desirable requirements for an animal feeder, there is provided a gravity operated animal feeder. The feeder includes a reservoir area defined by at least two vertically sloped upper sides projecting upward and away from each other at distal ends of the at least two vertically sloped upper sides. The feeder also includes a dispensing area located under and: (i) in feeding communication with the reservoir area, and (ii) including at least two vertically sloped lower sides projecting downward and toward each other at proximal ends of the at least two vertically sloped lower sides. Further, the feeder includes a vertical frame spaced from at least one of the at least two vertically sloped lower sides and defining an animal feeding region located adjacent to the dispensing area between the vertical frame and the at least one of the at least two vertically sloped lower sides. And further, the feeder includes a feeding trough area located under and: (i) in feeding communication with the dispensing area, and (ii) including a bottom located directly under and spaced from the proximal ends of the at least two vertically sloped lower sides.

In other aspects, there is disclosed a gravity operated animal feeder. The feeder includes a reservoir area defined by at least two vertically sloped upper sides projecting upward and away from each other at distal ends of the at least two vertically sloped upper sides. The feeder also includes a dispensing area located under and: (i) in feeding communication with the reservoir area, and (ii) including at least two vertically sloped lower sides projecting downward and toward each other at proximal ends of the at least two vertically sloped lower sides. A vertical frame is spaced from at least one of the at least two vertically sloped lower sides and defining an animal feeding region located adjacent to the dispensing area between the vertical frame and the at least one of the at least two vertically sloped lower sides. A feeding trough area is located under and: (i) in feeding communication with the dispensing area, and (ii) including a bottom located directly under and spaced from the proximal ends of the at least two vertically sloped lower sides. At least one animal stop bar is connected between the vertical frame and at least one of the at least two vertically sloped lower sides. The animal stop bar is oriented in (i) a substantially only vertical direction relative to an up and down orientation of the feeder and (ii) a vertically sloped direction relative to a front to back orientation of the feeder. A substantially horizontal dispensing bar is connected to proximal ends of the at least two vertically sloped lower sides and the dispensing bar is spaced from the bottom.

In yet other aspects, there is disclosed a gravity operated animal feeder. The feeder includes a reservoir area defined by at least two vertically sloped upper sides projecting upward and away from each other at distal ends of the at least two vertically sloped upper sides. At least one of the at least two vertically sloped upper sides is vertically sloped in a range from 5 degrees off of vertical to 20 degrees off of vertical. The feeder further includes a dispensing area located under and: (i) in feeding communication with the reservoir area, (ii) including at least two vertically sloped lower sides projecting downward and toward each other at proximal ends of the at least two vertically sloped lower sides and (iii) the at least one of the at least two vertically sloped lower sides that is vertically sloped in the range from 40 degrees above horizontal to 80 degrees above horizontal is a substantially closed planar surface back vertically sloped side. A vertical frame is spaced from at least one of the at least two vertically sloped lower sides and defining an animal feeding region located adjacent to the dispensing area between the vertical frame and the at least one of the at least two vertically sloped lower sides. A feeding trough area is located under and: (i) in feeding communication with the dispensing area, and (ii) including a bottom substantially horizontal surface located directly under and spaced from the proximal ends of the at least two vertically sloped lower sides.

Other aspects of the disclosure are directed to configurations and features for the reservoir area, the dispensing area, the vertical frame, the feeding trough area and/or the animal stop bar, each in and of itself as well as may be related to other parts of the feeder.

As used herein, "vertical" and "vertically" and formatives thereof, mean the orientation of a structure in the stated dimension of that structure is greater than 50% in the vertical direction than in the horizontal direction, i.e., between plus and minus 45 degrees off of completely vertical.

As used herein, "horizontal" and "horizontally" and formatives thereof, mean the orientation of a structure in the stated dimension of that structure is greater than 50% in the horizontal direction than in the vertical direction, i.e., between plus and minus 45 degrees off of completely horizontal.

BRIEF DESCRIPTION OF THE DRAWINGS

The invention may be more completely understood in consideration of the following detailed description of various embodiments of the invention in connection with the accompanying drawings, in which.

Figure 1:
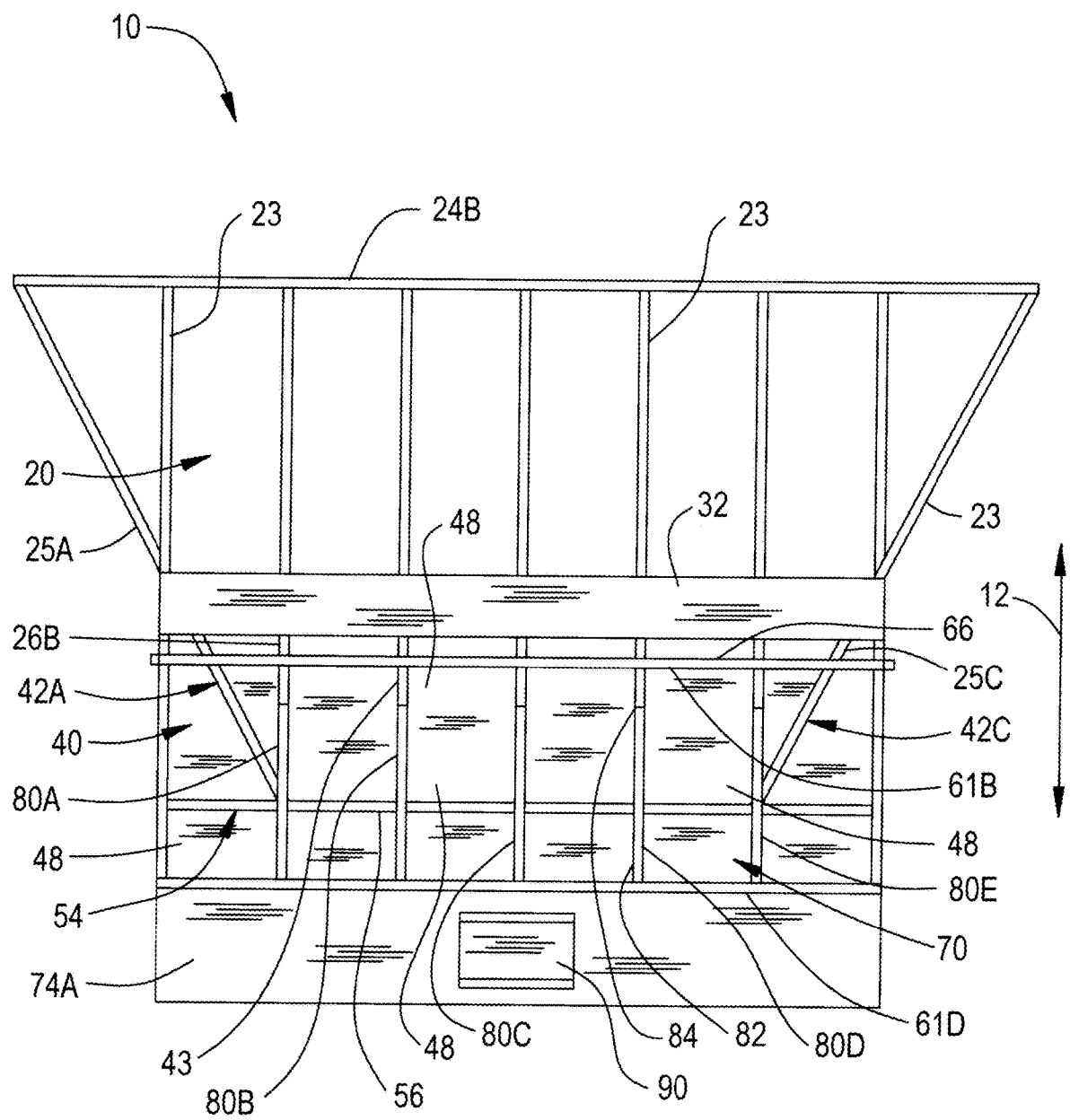
FIG. 1 is a front view of a gravity operated animal feeder.
Figure 2:
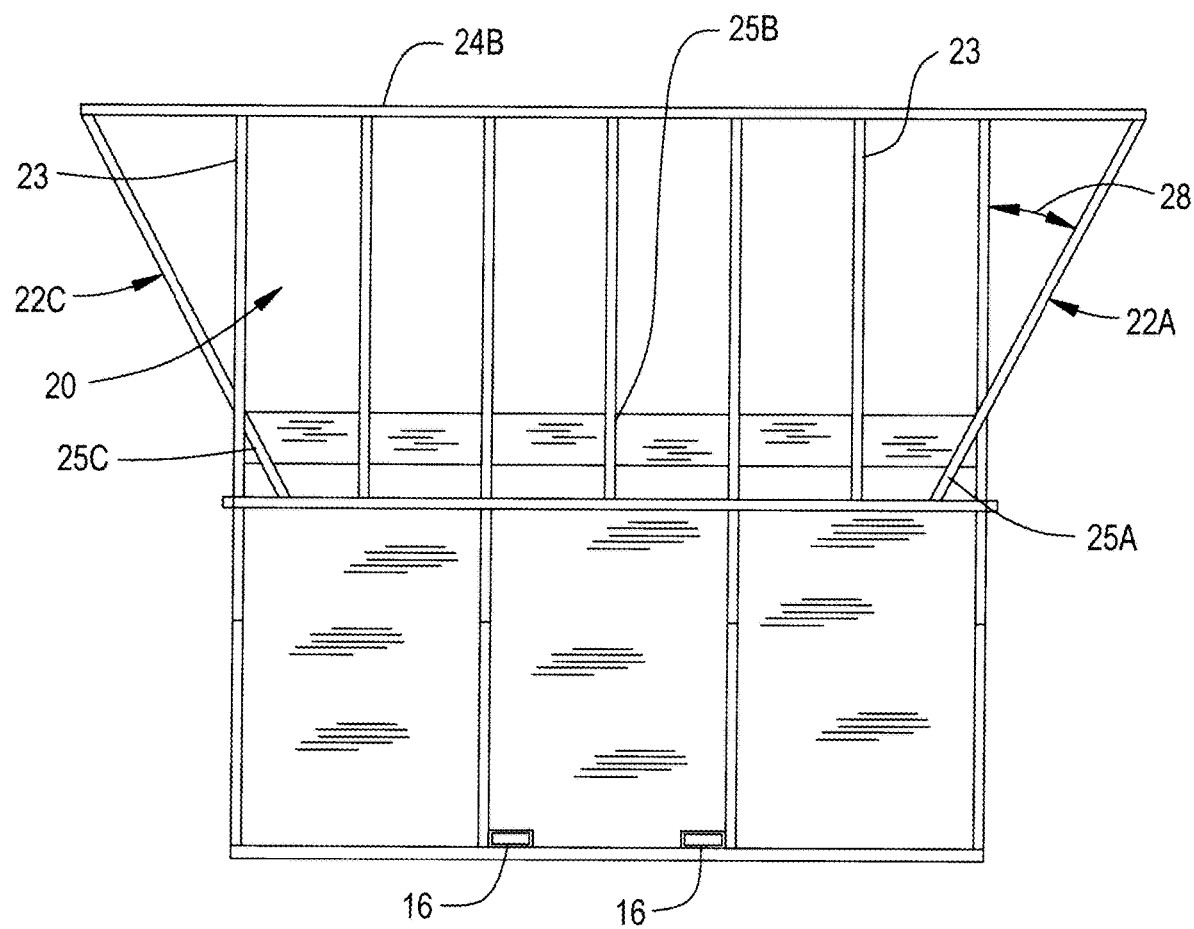
FIG. 2 is a back view of that in FIG. 1.
Figure 3:
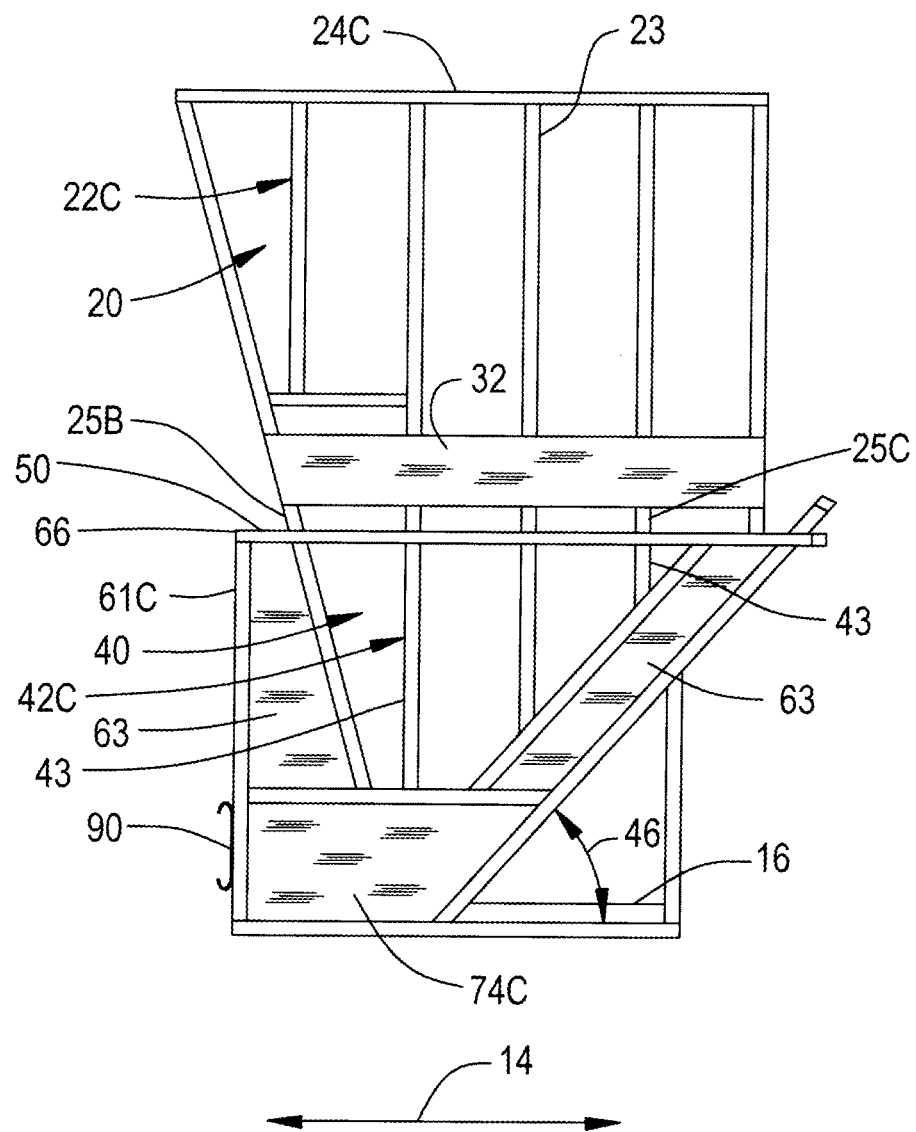
FIG. 3 is a right side view of that in FIG. 1.
Figure 4:
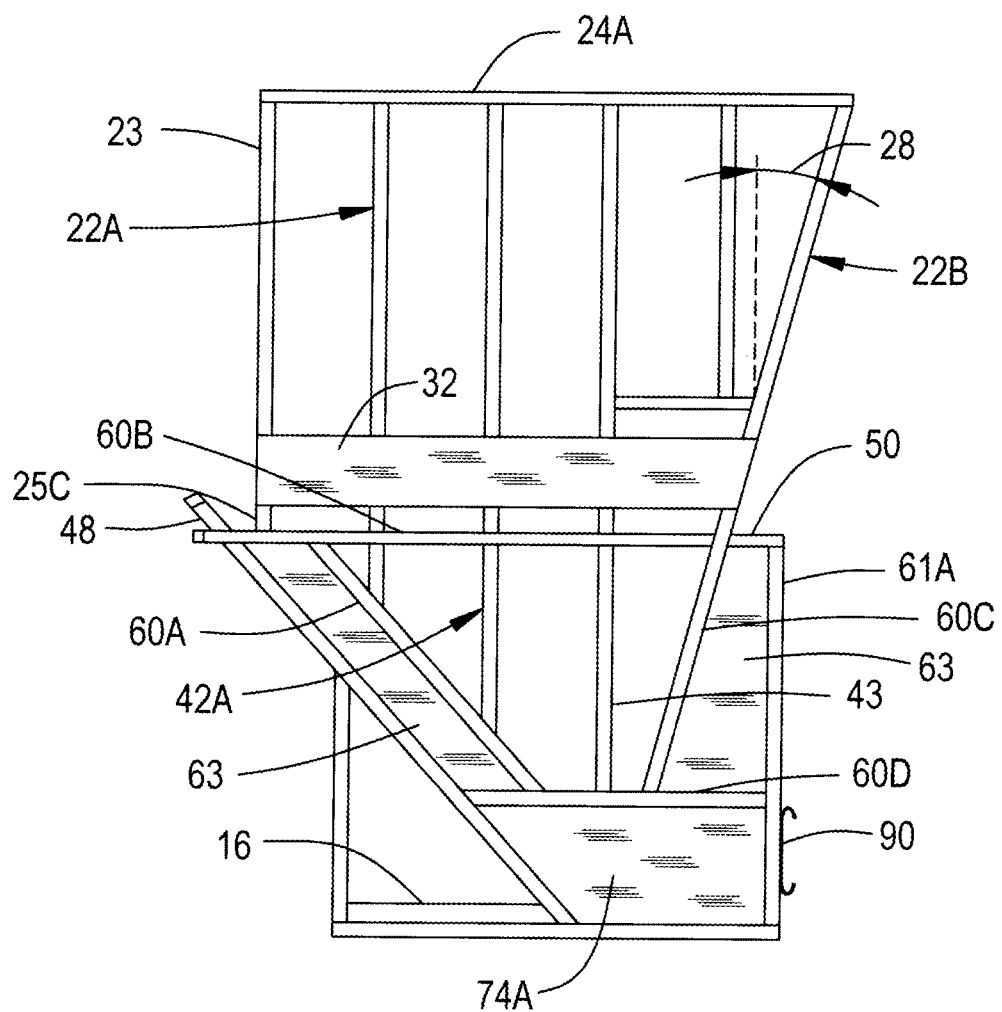
FIG. 4 is left side view of that in FIG. 1.
Figure 5:
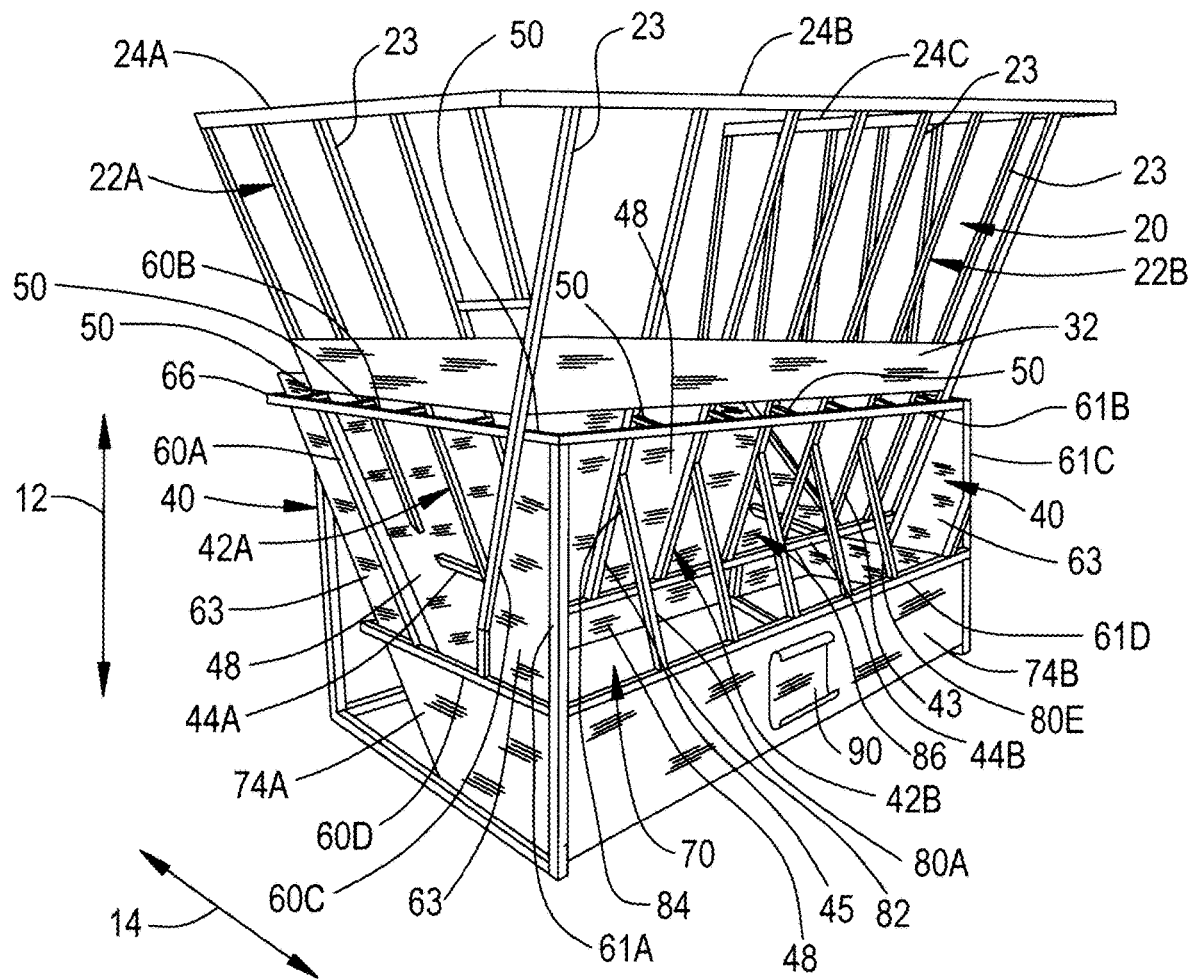
FIG. 5 is a front left corner perspective view of that in FIG. 1.
Figure 6:
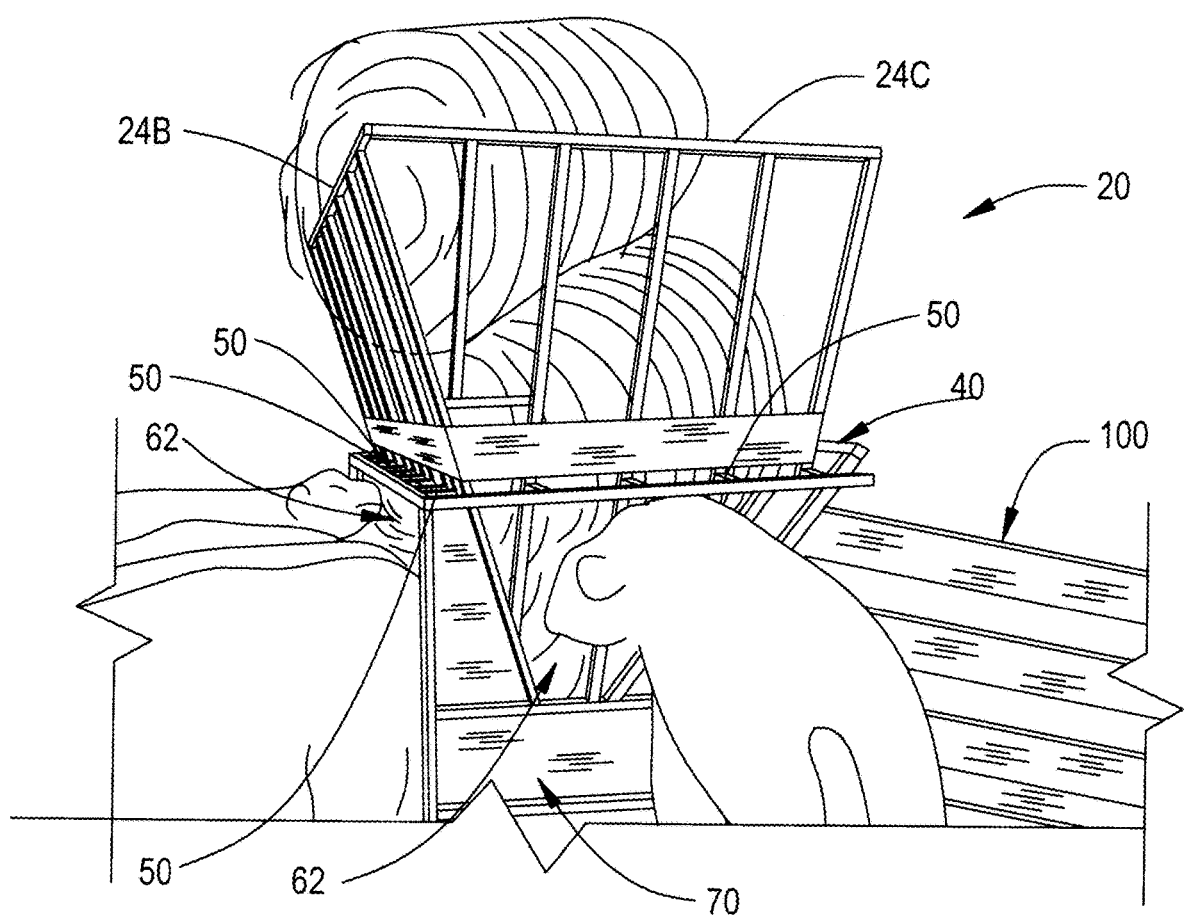
FIG. 6 is a back perspective view of that in FIG. 1, depicting looking down into the feeder from the back side.

The drawings show some but not all embodiments. The elements depicted in the drawings are illustrative and not necessarily to scale, and the same (or similar) reference numbers denote the same (or similar) features throughout the drawings, though all the same (or similar) features are not always separately numbered to help avoid over numbering and obscuring what the drawings are disclosing. The horizontal surface shading lines help depict preferably closed flat surfaces, as compared to locations without any surface shading that represent open area between structures.

DETAILED DESCRIPTION

In accordance with the practice of my innovative feeder, as seen in the Figures, there is an animal feeder 10. Preferably the animal feeder operates by at least gravity acting on the feed, and more preferably only by gravity acting on the feed (though there can be some help from the animals being fed too, but most preferably, no automated/electrical help needed to dispense the feed). The feeder 10 includes a reservoir area 20 defined by at least two vertically sloped upper sides 22A, 22B, and preferably three such sides so also including 22C, projecting upward and away from each other at distal ends 24A, 24B of the at least two vertically sloped upper sides, and when preferably three such sides then also 24C. Feeder 10 also includes a dispensing area 40, located under and in feeding communication with reservoir area 20. Dispensing area 40 includes at least two vertically sloped lower sides 42A, 42B, and preferably three such sides so also including 42C, projecting downward and toward each other at proximal ends 44A, 44B of the at least two vertically sloped lower sides, and when preferably three such sides then also 44C. In this regard, even more preferably, at least one of the at least two vertically sloped lower sides is a substantially closed planar surface 48. Such a closed planar surface, and preferably a smooth surface also, aids to direct the animal feed downward for access by the animals and toward a bottom of the feeder where feed collects and is not wasted.

Feeder 10 further includes a vertical frame, for example with sides 60A, 60B, 60C and 60D, with or without plated zones 63, spaced from at least one side 42A of the at least two vertically sloped lower sides, and preferably all such sides 42B and 42C, and defining an animal feeding region 62 located adjacent to the dispensing area between the vertical frame and the at least one side 42A of the at least two vertically sloped lower sides. For example, there can be upper end spacers 50 connected between the upper end of bars 43 of sides 42A-C and the top sides (e.g., 60B, 61B) adjacent to upper edge 66. The vertical frame can have any number of sides and any variety of shapes, as long as the animals can gain access to the dispensing area in the animal feeding region 62. For example, a front frame could have sides 61A, 61B, 61C and 61D, all of which are more rectangular in shape and sized larger than vertical side frame sides 60A, 60B, 60C and 60D. Feeder 10 also includes a feeding trough area 70 located under and in feeding communication with the dispensing area 40. Trough area 70 includes a bottom 72, preferably as a horizontal surface, located directly under and spaced from the proximal ends 44A, 44B of the at least two vertically sloped lower sides, and preferably also 44C when there are three such vertically sloped lower sides. Trough area 70 also includes trough sides 74A, 74B, and 74C projecting up from, and connected to a perimeter of, bottom 72. These sides, in combination with a lower portion of planar surface 48 (that forms the back vertically sloped side) define the trough area 70. This area is where animal feed is primarily dispensed for the animals, as well as accessible portions of the dispensing area 40 in animal feeding region 62 inside of the sides 42A, 42B, and 42C. Further in this regard, for example, a substantially horizontal dispensing bar 54 can be connected to proximal ends 44A, 44B of the at least two vertically sloped lower sides, and preferably 44C when that exists too, and the dispensing bar spaced from the bottom. Dispensing bar 54 can further aid dispensing to allow access, yet not too much access, and to provide strength to the proximal ends 44A-C, as desired. Still further, preferably, horizontal dispensing bar 54 can be spaced from the vertical frame at least for a portion 56 of the dispensing bar that is located between ends of the dispensing bar. Each side 42A-C preferably has a dispensing bar 54.

In other aspects, the feeder can include at least one animal stop bar, for example bars 80A, 80B, 80C, 80D and 80E, connected between the vertical frame and at least one of the at least two vertically sloped lower sides. That is, the animal stop bar(s) can be connected at a lower end 82 to the vertical frame and can be connected at an upper end 84 to the at least one side 42B of the at least two vertically sloped lower sides. Further in this regard, and without being limited to a theory of understanding, the inventor has surprisingly found this new configuration for the stop bar(s) is to make it(them) oriented in a substantially only vertical direction relative to an up and down orientation 12 of the feeder, and make it(them) oriented in a vertically sloped direction relative to a front to back orientation 14 of the feeder. In this way, this configuration aids each animal to better feed at the feeder and in proximity to the feeding trough area, resulting in less wasted feed. Still further in this regard, and more preferably, the animal stop bar(s) 80A(B-E) can be connected to the at least one side 42B of the at least two vertically sloped lower sides and form(s) a triangular region 86 bounded by the upper end 84 of the animal stop bar and a portion 45 of the at least one side 42B of the at least two vertically sloped lower sides connected thereto. Yet still further, and even more preferably, a plurality of animal stop bars 80A-E can be connected between the vertical frame, e.g., 61B, and at least one side 42B of the at least two vertically sloped lower sides, where each animal stop bar is substantially parallel to and horizontally spaced from each adjacent animal stop bar, and each animal stop bar can be connected to the at least one of the at least two vertically sloped lower sides to form a triangular prism region bounded in part by the upper end 84 of each animal stop bar, the bar 80A-E itself, and the portion 45 of the at least one side 42B of the at least two vertically sloped lower sides connected thereto.

Considering other features of feeder 10, there is disclosed at least one of the at least two vertically sloped upper sides, and preferably all such sides, can be at least two upper side bars 23 that are spaced from each other. While the sides 22A-C could be closed surfaces, to save materials, costs and/or reduce weight, and yet still get the needed strength and feed containment for the sides, spaced apart bars are preferred for bulk animal feed like hay in bailed, rolled or loose form. And, more preferably in this regard, the at least two upper side bars 23 can be substantially parallel to and horizontally spaced from each other, and most preferably all such bars forming the upper sides 22A-C have such orientation relative to one another. When bars are used, it can be advantageous to also use a stop plate 32 connected to proximal ends 25A, 25B of the at least two vertically sloped upper sides (and 25C when three such sides) and just above an upper edge 66 of the vertical frame. In this way, animals can be prevented from trying to get access to feed in the reservoir area that has not yet progressed down to the dispensing area. Stop plate 32 can have a height of four to sixteen inches, as desired, though preferably is in the range of eight to twelve inches to get the desired restriction without too much added weight. As an additional or alternative feature, at least one of the at least two vertically sloped upper sides, and preferably all such sides, can be vertically sloped in a range from 5 degrees off of vertical to 20 degrees off of vertical, as shown relative to angle 28. More preferably, angle 28 is in the range of 10 degrees off of vertical to 15 degrees off of vertical. With these added considerations, storage and dispensing can both be enhanced without one compromising the other.

Turning to other features of the dispensing area, other advantages can be seen, for similar reasons as discussed for the reservoir area. For example, at least one of the at least two vertically sloped lower sides, and preferably all such sides 42A-C, can include at least two lower side bars 43 that are spaced from each other. More preferably, the at least two lower side bars 43 can be substantially parallel to and horizontally spaced from each other. Still further, for example, at least one of the at least two vertically sloped lower sides, and preferably side 48, is vertically sloped in a range from 40 degrees off of horizontal to 80 degrees off of horizontal, as seen at angle 46. More preferably, and in increasing preference, angle 46 can be in the range of 45 degrees off of horizontal to 75 degrees off of horizontal, 50 degrees off of horizontal to 70 degrees off of horizontal, or 55 degrees off of horizontal to 65 degrees off of horizontal. With these added considerations, storage and dispensing can both be enhanced without one compromising the other, especially dispensing to better aid gravity to dispense feed down and toward the feeding trough.

In yet other aspects, preferably the feeder 10 can include the at least two vertically sloped upper sides 22A, 22B, being contiguous with the at least two vertically sloped lower sides 42A, 42B, and preferably all such related upper and lower sides being contiguous with their upper/lower counterpart. Yet more preferably, in this regard, the at least two vertically sloped upper sides 22A, 22B can be a continuous extension of the at least two vertically sloped lower sides 42A, 42B, and preferably all such related upper and lower sides being continuous, i.e., formed from one continuous bar as opposed to two lengths of bar joined together.

In use, some other features can be better understood. For example, preferably a perimeter of the dispensing area 40 is located wholly within a downward projection of a perimeter of the reservoir area 20. That is, the reservoir area 20, preferably, completely flows into the dispensing area 40 as gravity exerts force downward and feed is dispensed downward and inward to better enable continuous and unjammed feeding. Additionally in this regard, preferably, the reservoir area 20 and the dispensing area 40 form a single continuous feed holding area, as seen in all the Figures here.

Figure 7:
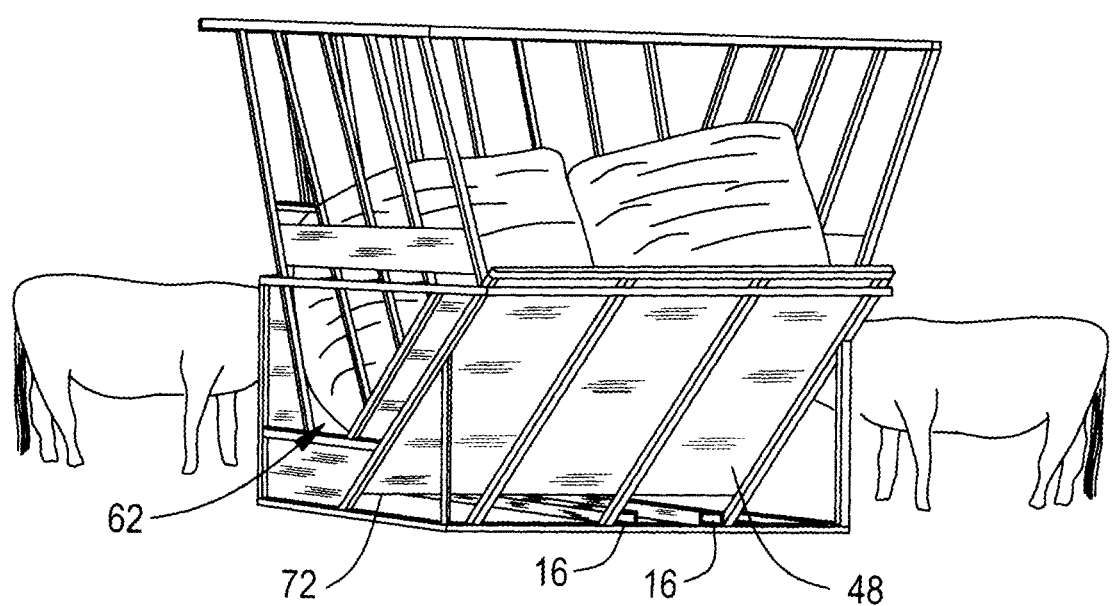
FIG. 7 is a front right corner perspective view of that in FIG. 1, with the feeder in place along a fence line and fully loaded with feed bales so animals can approach it on only three sides; and, FIG. 8 is a back right corner perspective view of that in FIG. 1, with the feeder in an open area so animals can approach it on all sides and with the feed bales now partially eaten and dropping further into the feeder.
Figure 8:
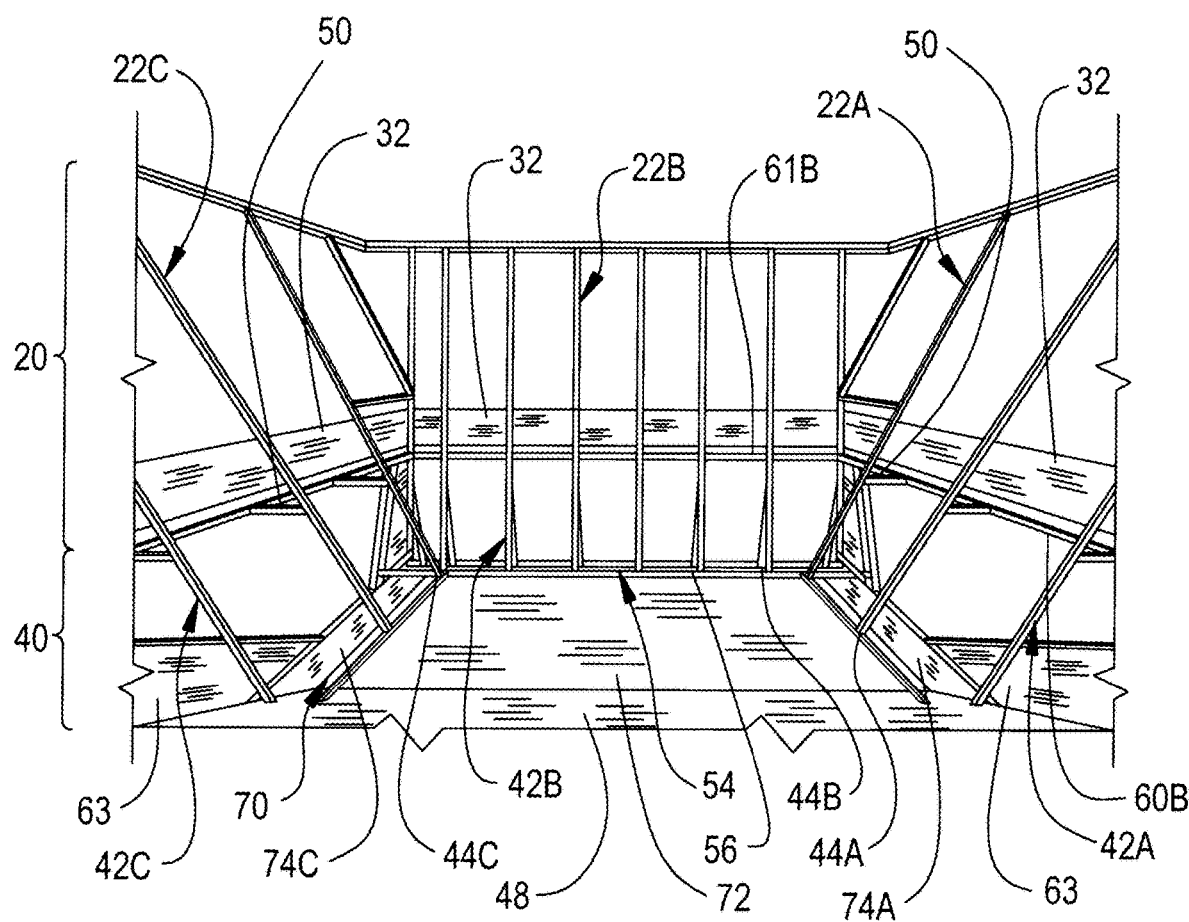

In accordance with practice of the innovative feeder, one or more of the following advantages can be realized, as desired. Do not have to remove any existing fence 100 to use it, just push up against the inside of the fence 100 and then load feed into the rear of the feeder from outside the fence (e.g., FIG. 7). Allows more cattle to feed at one time than any existing fence line feeder, in comparison to width of the feeder. Can hold multiple bales in vertical position as much as 3 high, 6 bales in a 10 foot wide feeder, for conventional round bales. Due to reservoir size possible here, feed less often than any other feeder or method used in the industry, while still achieving a low percentage of wasted feed. More reliable, continuous feeding possible due, at least in part, to reservoir and dispensing size and their individual, and combined, configuration. Bales less likely to get stuck in feeder, at least in part due to access to feed from the side(s), as well as the front, and the configuration of the dispensing area and/or animal feeding region. Easily movable through its forklift ready base 16 at the rear of the feeder. Easy to dump the contents through its front mounted dump attachment 90 (e.g., FIGS. 1, 3-5). Ideal for use in calving pens as calves cannot jump through feeder as with other fence line feeders, at least in part because the fence stays in place, if desired. Less waste than any bale feeder on the market. For example, after feeding 6 round bales, when the feeder is removed there is less than 20% waste, preferably less than 15% waste, and more preferably, in degrees of increasing preference, less than 10%, less than 5% and nearly zero percent, waste.

Preferred dimensions of the feeder are: about 10 feet to about 14 feet wide from side to side, preferably about 12 feet; about 5 feet to about 8 feet deep from front to back, preferably about 7 feet; and, about 7 feet to about 11 feet high from top to bottom, preferably about 9 feet. Conventional rigid materials can be used to make my animal feeding reservoir and dispenser in conjunction with the teaching herein, for example, steel, aluminum, or other metal compositions of sufficient strength as would be discerned by one of ordinary skill in the art in combination with the teachings herein, are preferred.

Additional discussion of embodiments in various scopes now follows:

A. A gravity operated animal feeder including a reservoir area defined by at least two vertically sloped upper sides projecting upward and away from each other at distal ends of the at least two vertically sloped upper sides. The feeder including a dispensing area located under and: (i) in feeding communication with the reservoir area, and (ii) including at least two vertically sloped lower sides projecting downward and toward each other at proximal ends of the at least two vertically sloped lower sides. The feed further including a vertical frame spaced from at least one of the at least two vertically sloped lower sides and defining an animal feeding region located adjacent to the dispensing area between the vertical frame and the at least one of the at least two vertically sloped lower sides. And, the feeder including a feeding trough area located under and: (i) in feeding communication with the dispensing area, and (ii) including a bottom located directly under and spaced from the proximal ends of the at least two vertically sloped lower sides.

B. The feeder of any of the prior embodiments, further comprising at least one animal stop bar connected between the vertical frame and at least one of the at least two vertically sloped lower sides.

C. The feeder of any of the prior embodiments, wherein the animal stop bar is connected at a lower end to the vertical frame and is connected at an upper end to the at least one of the at least two vertically sloped lower side.

D. The feeder of any of the prior embodiments, wherein the animal stop bar is oriented in (i) a substantially only vertical direction relative to an up and down orientation of the feeder and (ii) a vertically sloped direction relative to a front to back orientation of the feeder.

E. The feeder of any of the prior embodiments, wherein the animal stop bar connected to the at least one of the at least two vertically sloped lower sides forms a triangular region bounded by the upper end of the animal stop bar and a portion of the at least one of the at least two vertically sloped lower sides connected thereto.

F. The feeder of any of the prior embodiments, further comprising a plurality of animal stop bars connected between the vertical frame and at least one of the at least two vertically sloped lower sides wherein each animal stop bar is substantially parallel to and horizontally spaced from each adjacent animal stop bar and each animal stop bar is connected to the at least one of the at least two vertically sloped lower sides to form a triangular prism region bounded by an upper end of the animal stop bar and a portion of the at least one of the at least two vertically sloped lower sides connected thereto.

G. The feeder of any of the prior embodiments, wherein at least one of the at least two vertically sloped upper sides comprises at least two upper side bars that are spaced from each other.

H. The feeder of any of the prior embodiments, wherein the at least two upper side bars are substantially parallel to and horizontally spaced from each other.

I. The feeder of any of the prior embodiments, wherein at least one of the at least two vertically sloped lower sides comprises at least two lower side bars that are spaced from each other.

J. The feeder of any of the prior embodiments, wherein the at least two lower side bars are substantially parallel to and horizontally spaced from each other.

K. The feeder of any of the prior embodiments, wherein the at least two vertically sloped upper sides are contiguous with the at least two vertically sloped lower sides.
L. The feeder of any of the prior embodiments, wherein the at least two vertically sloped upper sides are a continuous extension of the at least two vertically sloped lower sides.
M. The feeder of any of the prior embodiments, further comprising a stop plate connected to proximal ends of the at least two vertically sloped upper sides and just above an upper edge of the vertical frame.
N. The feeder of any of the prior embodiments, further comprising a substantially horizontal dispensing bar connected to proximal ends of the at least two vertically sloped lower sides and the dispensing bar spaced from the bottom.
O. The feeder of any of the prior embodiments, wherein the horizontal dispensing bar is spaced from the vertical frame at least for a portion of the dispensing bar that is located between ends of the dispensing bar.
P. The feeder of any of the prior embodiments, further comprising a perimeter of the dispensing area being located wholly within a downward projection of a perimeter of the reservoir area.
Q. The feeder of any of the prior embodiments, further comprising the reservoir area and the dispensing area forming a single continuous feed holding area.
R. The feeder of any of the prior embodiments, at least one of the at least two vertically sloped lower sides comprises a substantially closed planar surface.
S. The feeder of any of the prior embodiments, wherein at least one of the at least two vertically sloped upper sides is vertically sloped in a range from 5 degrees off of vertical to 20 degrees off of vertical.
T. The feeder of any of the prior embodiments, wherein at least one of the at least two vertically sloped lower sides is vertically sloped in a range from 40 degrees off of horizontal to 80 degrees off of horizontal.
U. The feeder of any of the prior embodiments, wherein the at least one of the at least two vertically sloped lower sides that is vertically sloped in the range from 40 degree off of horizontal to 80 degrees off of horizontal is a substantially closed planar surface back vertically sloped side.
V. The feeder of any of the prior embodiments, wherein the bottom is a horizontal surface.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the animal feed reservoir and/or dispenser arts, and all such modifications and other embodiments are intended and deemed to be within the scope of the present invention.

What is claimed is:

1. A gravity operated animal feeder comprising:
   a reservoir area defined by at least two vertically sloped upper sides projecting upward and away from each other at distal ends of the at least two vertically sloped upper sides;
   a dispensing area located under and: (i) in feeding communication with the reservoir area, and (ii) including at least two vertically sloped lower sides projecting downward and toward each other at proximal ends of the at least two vertically sloped lower sides;
   a vertical frame spaced from at least one of the at least two vertically sloped lower sides and defining an animal feeding region located adjacent to the dispensing area between the vertical frame and the at least one of the at least two vertically sloped lower sides;
   a plurality of animal stop bars connected between the vertical frame and at least one of the at least two vertically sloped lower sides wherein each animal stop bar is substantially parallel to and horizontally spaced from each adjacent animal stop bar and each animal stop bar is connected to the at least one of the at least two vertically sloped lower sides to form a triangular prism region bounded by an upper end of the animal stop bar and a portion of the at least one of the at least two vertically sloped lower sides connected thereto; and,
   a feeding trough area located under and: (i) in feeding communication with the dispensing area, and (ii) including a bottom located directly under and spaced from the proximal ends of the at least two vertically sloped lower sides.

2. The feeder of claim 1, wherein the animal stop bar is connected at a lower end to the vertical frame and is connected at an upper end to the at least one of the at least two vertically sloped lower side.

3. The feeder of claim 2, wherein the animal stop bar is oriented in (i) a substantially only vertical direction relative to an up and down orientation of the feeder and (ii) a vertically sloped direction relative to a front to back orientation of the feeder.

4. The feeder of claim 2, wherein the animal stop bar connected to the at least one of the at least two vertically sloped lower sides forms a triangular region bounded by the upper end of the animal stop bar and a portion of the at least one of the at least two vertically sloped lower sides connected thereto.

5. The feeder of claim 1, wherein at least one of the at least two vertically sloped upper sides comprises at least two upper side bars that are spaced from each other.

6. The feeder of claim 5, wherein the at least two upper side bars are substantially parallel to and horizontally spaced from each other.

7. The feeder of claim 1, wherein at least one of the at least two vertically sloped lower sides comprises at least two lower side bars that are spaced from each other.

8. The feeder of claim 7, wherein the at least two lower side bars are substantially parallel to and horizontally spaced from each other.

9. The feeder of claim 1, wherein the at least two vertically sloped upper sides are contiguous with the at least two vertically sloped lower sides.

10. The feeder of claim 9, wherein the at least two vertically sloped upper sides are a continuous extension of the at least two vertically sloped lower sides.

11. The feeder of claim 1, further comprising a stop plate connected to proximal ends of the at least two vertically sloped upper sides and just above an upper edge of the vertical frame.

12. The feeder of claim 1, further comprising a substantially horizontal dispensing bar connected to proximal ends of the at least two vertically sloped lower sides and the dispensing bar spaced from the bottom.

13. The feeder of claim 12, wherein the horizontal dispensing bar is spaced from the vertical frame at least for a portion of the dispensing bar that is located between ends of the dispensing bar.

14. The feeder of claim 1, further comprising a perimeter of the dispensing area being located wholly within a downward projection of a perimeter of the reservoir area.

15. The feeder of claim 1, further comprising the reservoir area and the dispensing area forming a single continuous feed holding area.

16. The feeder of claim 1, at least one of the at least two vertically sloped lower sides comprises a substantially closed planar surface.

17. The feeder of claim 1, wherein at least one of the at least two vertically sloped upper sides is vertically sloped in a range from 5 degrees off of vertical to 20 degrees off of vertical.

18. The feeder of claim 1, wherein at least one of the at least two vertically sloped lower sides is vertically sloped in a range from 40 degrees off of horizontal to 80 degrees off of horizontal.

19. The feeder of claim 1, wherein the at least one of the at least two vertically sloped lower sides that is vertically sloped in a range from 40 degree off of horizontal to 80 degrees off of horizontal is a substantially closed planar surface back vertically sloped side.

20. The feeder of claim 1, wherein the bottom is a horizontal surface.

21. A gravity operated animal feeder comprising:
a reservoir area defined by at least two vertically sloped upper sides projecting upward and away from each other at distal ends of the at least two vertically sloped upper sides;
a dispensing area located under and: (i) in feeding communication with the reservoir area, and (ii) including at least two vertically sloped lower sides projecting downward and toward each other at proximal ends of the at least two vertically sloped lower sides;
a vertical frame spaced from at least one of the at least two vertically sloped lower sides and defining an animal feeding region located adjacent to the dispensing area between the vertical frame and the at least one of the at least two vertically sloped lower sides;
a feeding trough area located under and: (i) in feeding communication with the dispensing area, and (ii) including a bottom located directly under and spaced from the proximal ends of the at least two vertically sloped lower sides;
a plurality of animal stop bars connected between the vertical frame and at least one of the at least two vertically sloped lower sides wherein each animal stop bar is substantially parallel to and horizontally spaced from each adjacent animal stop bar and each animal stop bar is connected to the at least one of the at least two vertically sloped lower sides to form a triangular prism region bounded by an upper end of the animal stop bar and a portion of the at least one of the at least two vertically sloped lower sides connected thereto, and wherein the animal stop bar is oriented in (i) a substantially only vertical direction relative to an up and down orientation of the feeder and (ii) a vertically sloped direction relative to a front to back orientation of the feeder; and,
a substantially horizontal dispensing bar connected to proximal ends of the at least two vertically sloped lower sides and the dispensing bar spaced from the bottom horizontal surface.

22. The feeder of claim 21, wherein at least one of the at least two vertically sloped upper sides is vertically sloped in a range from 5 degrees off of vertical to 20 degrees off of vertical.

23. The feeder of claim 21, wherein at least one of the at least two vertically sloped lower sides is vertically sloped in a range from 40 degrees off of horizontal to 80 degrees off of horizontal.

24. A gravity operated animal feeder comprising:
a reservoir area defined by at least two vertically sloped upper sides projecting upward and away from each other at distal ends of the at least two vertically sloped upper sides, wherein at least one of the at least two vertically sloped upper sides is vertically sloped in a range from 5 degrees off of vertical to 20 degrees off of vertical;
a dispensing area located under and: (i) in feeding communication with the reservoir area, (ii) including at least two vertically sloped lower sides projecting downward and toward each other at proximal ends of the at least two vertically sloped lower sides and (iii) the at least one of the at least two vertically sloped lower sides that is vertically sloped in the range from 40 degrees above horizontal to 80 degrees above horizontal is a substantially closed planar surface back vertically sloped side;
a vertical frame spaced from at least one of the at least two vertically sloped lower sides and defining an animal feeding region located adjacent to the dispensing area between the vertical frame and the at least one of the at least two vertically sloped lower sides;
a plurality of animal stop bars connected between the vertical frame and at least one of the at least two vertically sloped lower sides wherein each animal stop bar is substantially parallel to and horizontally spaced from each adjacent animal stop bar and each animal stop bar is connected to the at least one of the at least two vertically sloped lower sides to form a triangular prism region bounded by an upper end of the animal stop bar and a portion of the at least one of the at least two vertically sloped lower sides connected thereto; and,
a feeding trough area located under and: (i) in feeding communication with the dispensing area, and (ii) including a bottom located directly under and spaced from the proximal ends of the at least two vertically sloped lower sides.

* * * * *